United States Patent
Nakayama et al.

(10) Patent No.: US 7,193,933 B2
(45) Date of Patent: Mar. 20, 2007

(54) PREHEATING BULK ERASING DEVICE FOR MAGNETO-OPTICAL DISK

(75) Inventors: Hiroshi Nakayama, Miyagi (JP); Atsushi Takeuchi, Miyagi (JP); Junichi Nemoto, Miyagi (JP); Hiroyuki Miura, Miyagi (JP)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 10/381,157

(22) PCT Filed: Jul. 15, 2002

(86) PCT No.: PCT/JP02/07153

§ 371 (c)(1), (2), (4) Date: Mar. 21, 2003

(87) PCT Pub. No.: WO03/010763

PCT Pub. Date: Feb. 6, 2003

(65) Prior Publication Data

US 2003/0235120 A1 Dec. 25, 2003

(30) Foreign Application Priority Data

Jul. 23, 2001 (JP) ............................. 2001-221416

(51) Int. Cl.
G11B 11/00 (2006.01)
(52) U.S. Cl. .................................. 369/13.04
(58) Field of Classification Search ............. 369/13.04, 369/13.03
See application file for complete search history.

(56) References Cited

U.S. PATENT DOCUMENTS

| | | | | |
|---|---|---|---|---|
| 4,686,661 A | * | 8/1987 | Isaka ........................ | 369/13.04 |
| 4,719,615 A | * | 1/1988 | Feyrer et al. ............... | 369/284 |
| 4,794,068 A | * | 12/1988 | Miyazaki et al. ........... | 430/345 |
| 4,970,711 A | * | 11/1990 | Martin et al. ............... | 369/100 |
| 5,051,970 A | * | 9/1991 | Ishii et al. ............... | 369/13.49 |
| 5,144,613 A | * | 9/1992 | Johnson et al. ............. | 369/100 |
| 5,195,080 A | * | 3/1993 | Komaki et al. ............. | 369/100 |
| 5,206,843 A | * | 4/1993 | Kaburagi .................. | 369/13.04 |
| 5,231,614 A | * | 7/1993 | Shindo et al. ........... | 369/13.04 |
| 5,469,413 A | * | 11/1995 | Kagawa .................... | 369/13.26 |
| 5,684,778 A | * | 11/1997 | Yamada et al. ............. | 369/100 |
| 6,767,697 B2 | * | 7/2004 | Uchida et al. ............. | 369/13.4 |

FOREIGN PATENT DOCUMENTS

| | | |
|---|---|---|
| JP | 63-171429 | 7/1988 |
| JP | 04-147450 | 5/1992 |
| JP | 09-35267 | 2/1997 |
| JP | 2001-236695 | 8/2001 |

* cited by examiner

Primary Examiner—Tan Dinh
(74) Attorney, Agent, or Firm—Sonnenschein Nath & Rosenthal LLP

(57) ABSTRACT

When carrying out magnetization, annealing, and initialization of a recording film by applying a laser beam to the recording film while rotating an optical recording medium 10 by a motor 11, light of a strong visible-light lamp 15 is projected as parallel light to a reflecting mirror 14 via a lens 16 so as to apply light reflected by the reflecting mirror 14 to an area wider than a spot of the laser beam on the medium 10 for heating. At that time, a control unit 18 controls an intensity of the strong visible-light lamp 15 to raise a temperature of the medium 10 to a temperature of 80° C. or higher and a softening point of a substrate or lower, for example.

21 Claims, 6 Drawing Sheets

| SAMPLE NO. | LASER POWER | LAMP HEATING |
|---|---|---|
| 1 | 0mW | NO |
| 2 | 800mW | NO |
| 3 | 800mW | YES |
| 4 | 600mW | YES |

FIG.10
| SAMPLE NO. | LASER POWER | LAMP HEATING | OPTIMAL SENSIBILITY | TRACKING ERROR RATIO |
|---|---|---|---|---|
| 2-1 | 0mW | NO | 7.0mW | 0 |
| 2-2 | 600mW | NO | 6.7mW | 0.11 |
| 2-3 | 600mW | YES | 6.5mW | 0.15 |
| 2-4 | 450mW | YES | 6.7mW | 0.09 |
FIG.11
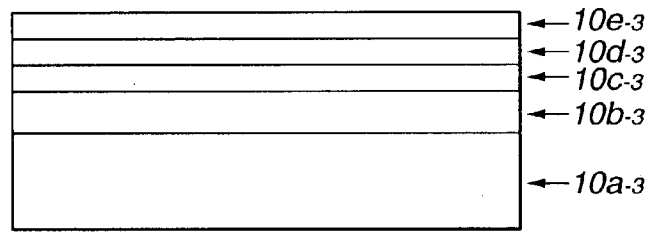
FIG.12
| SAMPLE NO. | LASER POWER | LAMP HEATING | OPTIMAL SENSIBILITY | TRACKING ERROR RATIO |
|---|---|---|---|---|
| 3-1 | 0mW | NO | 13.4mW | 0 |
| 3-2 | 1500mW | NO | 13.1mW | 0.10 |
| 3-3 | 1500mW | YES | 12.8mW | 0.13 |
| 3-4 | 1400mW | YES | 13.1mW | 0.07 |
FIG.13
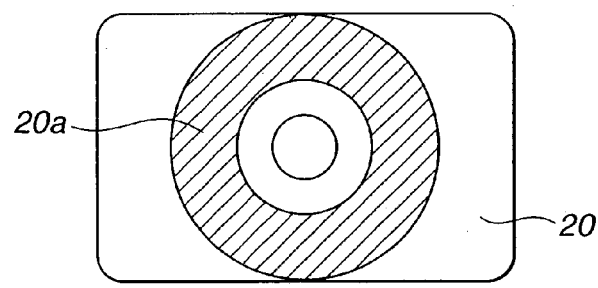

PREHEATING BULK ERASING DEVICE FOR MAGNETO-OPTICAL DISK

BACKGROUND OF THE INVENTION

The present invention relates to a bulk erase device for carrying out magnetization, initialization, or annealing a recording film of an optical recording medium wherein embossed-pit rows with address information are zoned in the radical direction by laser irradiation, and relates to a preheating bulk erase device for an optical recording medium, a preheating bulk erase method for an optical recording medium, and an optical recording medium, wherein the temperature of the medium is increased by partial laser irradiation to the recording film while rotating the medium.

Conventionally, for optical recording media, the method called zoning is used for increasing the recording capacity by effective use of a recording area. This is a method of obtaining, on a medium rotating at constant angular velocity, for example, the recording density of a similar degree over the entire surface of the medium by switching a recording reference frequency for recording/reproducing for each radius.

By way of example, with ISO/IEC14517 (130 mm 4×), ISO/IEC15286 (130 mm 8×), ISO/IEC15041 (90 mm 5×) and the like, which are optical magnetic media of the ISO Standards, the recording capacity of the medium is increased by using this method.

Specifically, since a data recording/reproducing area is radially divided into a plurality of zones as shown in FIG. 1, and the recording/reproducing frequency is different for each zone, the number of sectors within a cycle varies. Thus, an address area shows a partially radial shape for each radius as illustrated by 1a.

Moreover, with magneto-optical recording media, the medium is subjected to operation for uniformly arranging the magnetizing directions of a recording film before offering to users. Specifically, a greater magnetostatic field than a coercivity of the recording film is provided to the medium to perform operation for forcibly turning the magnetizing direction of the recording film to the erased direction, i.e. so-called magnetization.

Typically, when a recording film to be magnetized has a weak coercivity of the order of $0.8 \times 10^6$ A/m (A/m is an intensity of the magnetic field in SI unit), magnetization is possible by a weak magnetic field such as electromagnet. However, when magnetizing a recording film having a strong coercivity more than $1.19 \times 10^6$ to $1.59 \times 10^6$ A/m, the temperature of the recording film is increased to reduce the coercivity and apply a weak magnetostatic field less than $0.8 \times 10^6$ A/m so as to carry out magnetization.

With phase-change type media, the medium is subjected to operation for crystallizing the entire surface of a recording film before offering to users. Specifically, the recording film is heated/annealed by an amount more than a given amount to achieve initialization from a so-called Ad-depo state film wherein crystalline/amorphous exist in a mixed way after film formation to the totally crystallized state.

In this process of initialization, the recording film having a large area of some hundreds tracks is heated at a time to carry out magnetization and crystallization. This method is called bulk erase. Bulk erase is a method of heating a recording film by reducing in the radial direction of a medium a semiconductor laser of 1–2 W in an oval beam diameter having a major axis of more than 10 μm to provide only focusing on the recording film for irradiation to the rotating medium.

Bulk erase has not only an object of initialization of a recording layer, but also an effect (sensitivity shift) for reserving in advance the recording sensitivity or the reproducing sensitivity occurring at the time of repeated recording of a medium to control a sensitivity change during an user's medium service duration. It is considered that providing thermal energy to a recording film eases in advance atoms in an amorphous recording layer, thus obtaining stabilization of the recording film.

Parameters of bulk erase are the number of revolutions or linear velocity of a medium, radial feed pitch of a laser spot, laser power, laser beam width, and the like. Since these parameters can be controlled easily to allow stable occurrence of magnetization, initialization, and sensitivity shift, a very effective method is provided.

By carrying out tests on bulk erase of a magneto-optical recording medium in order to perform sensitivity shift and magnetization, the inventors of the present application have found the following problem. That is, after performing enough bulk erase for producing a predetermined sensitivity shift to the optical recording medium as shown in FIG. 1, which is radially zoned and has an address with embossed pit aligned radially in each zone, a tracking error is observed at a zone boundary. Then, the presence of a tracking-error increasing area was perceived as shown in a signal waveform diagram in FIG. 3.

FIG. 3 shows a relationship between an address signal and a tracking-error signal at a tenth track position from the zone boundary of the totally bulk-erased medium, wherein (a) shows an address signal, (b) shows a tracking-error signal, (c) shows an enlargement of an area F of the address signal (a), and (d) shows an enlargement of an area F of the tracking-error signal (b), respectively. In the Figure, E shows a track jump signal, G shows an enlarged address in the area F, and H shows a tracking-error increasing portion.

It is noted that the measuring conditions in FIG. 3 are linear velocity of 7.5 m/s, CLV, laser power of 1.5 mV, disc diameter of φ86 mm, measuring site of R40 mm, and application of tracking on a Land portion.

It is found that the tracking-error increasing portion H is not due to an influence of the address G, but has the same positional relationship with the address which existed in the zone of 10 tracks before. The address of as much as 10 tracks apart therefrom has some influence on a tracking error.

It is observed that the increasing amount of a tracking error in the tracking-error increasing portion H reaches 17% with respect to peak-to-peak amplitude of the track jump signal E, and that this phenomenon reaches some hundreds tracks out of the zone boundary. As a result, the drive (medium drive system) recognizes that those tracking-error increasing areas are defective areas, and carries out processing of replacement. Therefore, the medium has enormous replacement sectors.

The tracking-error increasing phenomenon as mentioned above does not occur when bulk erase is not performed. However, when bulk erase is not performed, the recording sensitivity varies during a period that an user uses a medium, and does not allow fulfillment of optimum recording/reproducing, causing an error.

It can be conceived to produce sensitivity shift according to a method of erasing record for each track by using a drive or the like, which requires, however, many times of erasing of record of the same track, taking a lot of time, providing no practical method.

SUMMARY OF THE INVENTION

An object of the present invention is to provide a preheating bulk erase device for an optical recording medium, a preheating bulk erase method for an optical recording medium, and optical recording medium, which allow fulfillment of magnetization or crystallization and a predetermined sensitivity shift by bulk erase, and a reduction in tracking error in the vicinity of the zone boundary.

As a result of examining achievement of the above object with effort, the inventors have found that a method of carrying out bulk erase with raised temperature of a medium is effective.

The bulk erase method is a method wherein a beam out of a high-power laser is put into an oval focus having a major axis of some hundreds microns on the surface of a recording film through an optical parts such as lens, prism, and the like to provide thermal energy to the recording film, thus producing sensitivity shift in a wide area.

As shown in FIG. 2, the laser beam is designed such that an output beam out of a laser 5 is put into focus on a recording film 8 from a reading surface 6 of the rotating medium through a resin substrate 7.

Since the laser light is absorbed mainly by the recording film 8, it is supposed that a temperature rise of the resin substrate 7 is caused by heat conduction from the recording film 8. Therefore, in the same way as the recording film 8, a temperature change of the resin substrate 7 is carried out in such a way as to have a quick increase from an ordinary temperatures to a predetermined temperature by passage of the beam, and then quick cooling.

On the other hand, the resin substrate has an address part with locally high internal stress and a data part (group part) with relatively low internal stress arranged thereon. It is supposed that when applying a beam on this resin substrate, the quick rise and quick drop of the temperature occur at the same time in a beam spot including the address part and the data part to enlarge unbalance of an internal stress and thus cause physical deformation of a track in the neighborhood of the zone boundary, leading to occurrence of an increase in tracking error. That is, if a quick temperature change of the resin substrate can be prevented, an increase in tracking error can be lowered.

For this reason, it is supposed that a quick temperature change due to bulk erase can be relieved by preheating the resin substrate in a wider region than the laser spot and reducing laser power by an amount of a temperature rise of the resin substrate so as to put the recording film at a predetermined temperature.

Since the medium formed by this preheating bulk erase method is characterized in that it is magnetized, provides a predetermined sensitivity shift, and has reduced tracking error, the present invention reaches completion.

The preheating bulk erase device for an optical recording medium of the present invention is a device for carrying out magnetization or annealing of a recording film by applying a laser beam to the recording film while rotating a magneto-optical recording medium, characterized in that it is provided with heating means for heating said medium when applying said laser beam.

Moreover, the preheating bulk erase device for an optical recording medium of the present invention is a device for carrying out initialization of a recording film by applying a laser beam to the recording film while rotating the phase-change type medium, characterized that it is provided with heating means for heating said medium when applying said laser beam.

Further, it is characterized in that said heating means apply light out of a lamp having a peak of light emission between ultraviolet wavelength and far infrared wavelength to a wider area than a spot of said laser beam.

Still further, it is characterized in that said heating means raise a temperature of said medium to a temperature lower than a softening point of a substrate.

Furthermore, it is characterized in that said heating means control an in-surface temperature difference of said medium within 30° C.

Further, It is characterized in that it is provided with means for continuing rotation of said medium until a temperature of said medium reaches a temperature within a range from an ordinary temperature to 50° C. after completion of application of said laser beam and heating.

Furthermore, the preheating bulk erase device for an optical recording medium of the present invention is characterized in that it is provided with feedback means for detecting a temperature of said medium and feeding back the detected temperature to said heating means so as to maintain the temperature of the medium constant.

Moreover, the preheating bulk erase method for an optical recording medium of the present invention is characterized in that it carries out magnetization or annealing of a recording film by applying a laser beam to the recording film while rotating a magneto-optical recording medium and performing a heating process for heating said medium upon application of said laser beam.

Further, the preheating bulk erase method for an optical recording medium of the present invention is characterized in that it carries out initialization of a recording film by applying a laser beam to the recording film while rotating a phase-change type medium and performing a heating process for heating said medium upon application of said laser beam.

Still further, it is characterized in that said heating process is carried out by applying light out of a lamp having a peak of light emission between ultraviolet wavelength and far infrared wavelength to a wider area than a spot of said laser beam.

Still further, it is characterized in that said heating process includes a process for raising a temperature of said medium to a temperature lower than a softening point of a substrate.

Furthermore, it is characterized in that said heating process includes a process for controlling an in-surface temperature difference of said medium within 30° C.

Further, It is characterized that it carries out a process for continuing rotation of said medium until a temperature of said medium reaches a temperature within a range from an ordinary temperature to 50° C. after completion of application of said laser beam and heating.

Still further, it is characterized in that said heating process includes a process for detecting a temperature of said medium and feeding back the detected temperature to said heating means so as to maintain the temperature of the medium constant.

Furthermore, the optical recording medium of the present invention is characterized it is manufactured by carrying out magnetization or annealing of a recording film by applying a laser beam to the recording film while rotating a magneto-optical recording medium and heating said medium upon application of said laser beam.

Further, the optical recording medium of the present invention is characterized it is manufactured by carrying out initialization of a recording film by applying a laser beam to the recording film while rotating a phase-change type medium and heating said medium upon application of said laser beam.

BRIEF DESCRIPTION OF THE DRAWINGS

FIG. 10 is a table illustrating the contents of various substrate samples used in the present invention, FIG. 11 is an explanatory view showing a sectional structure of an optical recording medium using a phase-change recording film used in the present invention, FIG. 12 is a table illustrating the contents of various substrate samples used in the present invention, and FIG. 13 is a plan view of a card-type optical recording medium to which the present invention is applied.

BEST MODE FOR CARRYING OUT THE INVENTION

With reference to the drawings, we will explain hereinafter the embodiments of the present invention.

(Embodiment 1)

Figure 1:
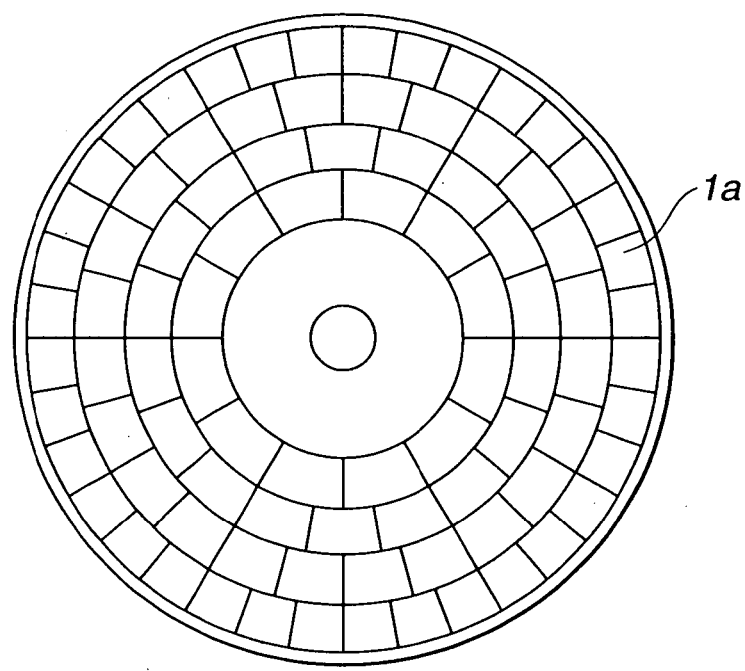
FIG. 1 is a plan view of an optical recording medium used in the present invention.
Figure 2:
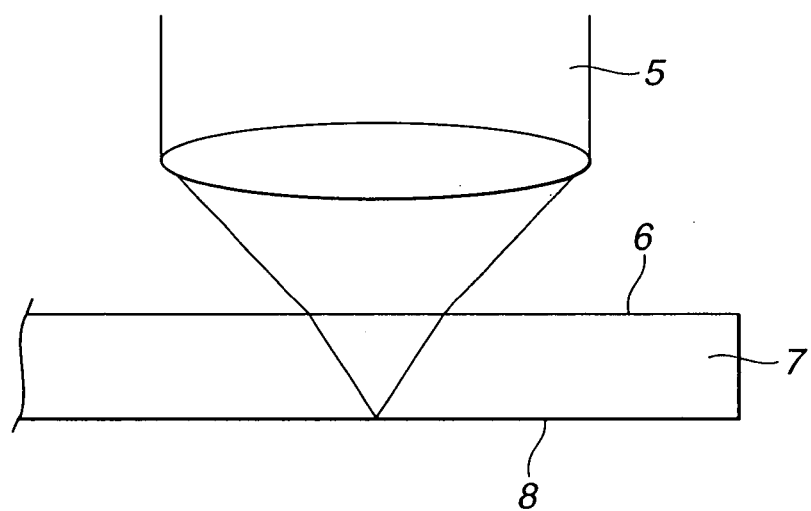
FIG. 2 is an explanatory view showing a device structure for performing bulk erase.
Figure 4:
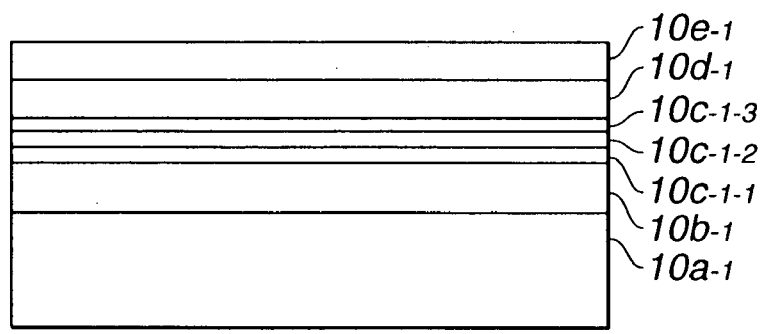
FIG. 4 is an explanatory view showing a sectional structure of an optical recording medium using a multi-layer recording film used in the present invention.

First of all, we will explain an embodiment using a magneto-optically recordable/reproducible multi-layer recording film. With a section of the used medium, as shown in FIG. 4, for example, a protective layer $10b$-1, a magneto-optical recording layer $10c$-1-1, $10c$-1-2, $10c$-1 -3, a protective layer $10d$-1, and a reflective layer $10e$-1 are laminated and formed one upon another by a sputtering method on a resin substrate $10a$-1 having an address layout in FIG. 1.

First, a chamber for sputtering each layer was sufficiently evacuated in advance until the reached degree of vacuum is lower than $10^{-5}$ Pa. Then, in the atmosphere of $1\times10^{-3}$ Pa to $6\times10^{-3}$ Pa, each film was formed by a power of 2–3 kW.

As the protective layer $10b$-1, a silicon nitride film of 80 nm was formed by performing reactive sputtering of a silicon target in the atmosphere of argon and nitrogen.

As the magneto-optical recording layer $10c$-1-1, a film was formed to obtain 40 nm film thickness by performing DC sputtering of a GdFeCoSi target in the atmosphere of argon. A composition of the target and a condition of film formation were adjusted in advance to achieve a transition-metal rich film having 350° C. or higher Curie temperature and 10 emu/cc saturation magnetization in the room temperature.

As the magneto-optical recording layer $10c$-1-2, a film was formed to obtain 40 nm film thickness by performing DC sputtering of a GdFeCoSi target in the atmosphere of argon. A composition of the target and a condition of film formation were adjusted in advance to achieve a rare-earth-metal rich film having 200° C. or higher Curie temperature and 150 emu/cc saturation magnetization in the room temperature.

As the magneto-optical recording layer $10c$-1-3, a film was formed to obtain 50 nm film thickness by performing DC sputtering of a TbFeCo target in the atmosphere of argon. A composition of the target and a condition of forming film were adjusted in advance to achieve a transition-metal rich film having 300° C. or higher Curie temperature, 20 KOe or greater coercivity in the room temperature, and 50 emu/cc saturation magnetization in the room temperature.

As the protective layer $10d$-1, a silicon nitride film of 20 nm was formed by performing reactive sputtering to a silicon target in the atmosphere of argon and nitrogen.

As the reflective film $10e$-1, a film of 10 nm thickness was formed by performing DC sputtering to an Al target in the atmosphere of argon.

Figure 5:
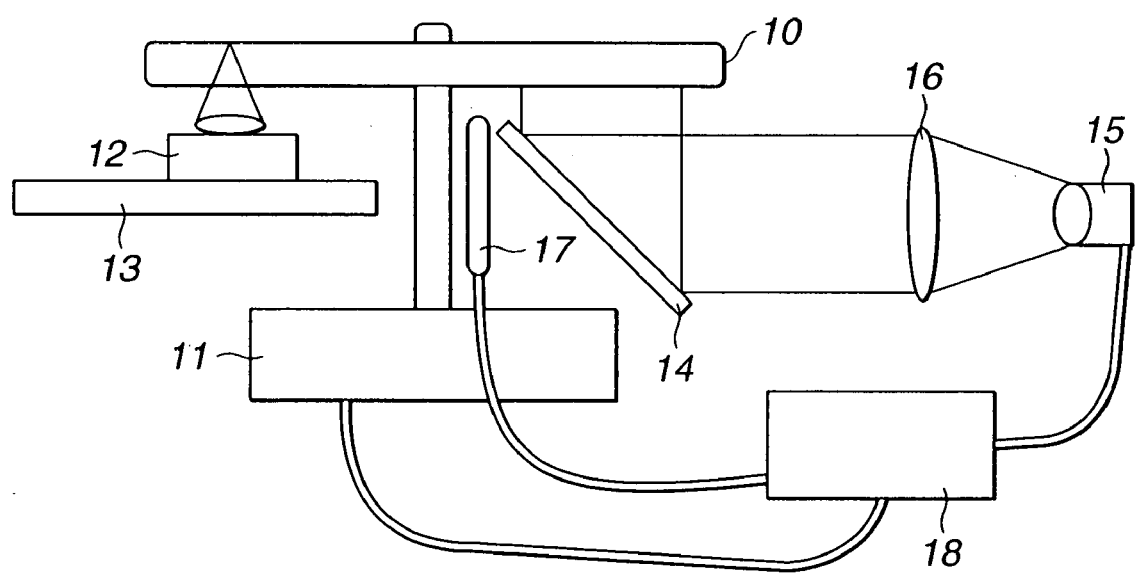
FIG. 5 is a general structural view showing an embodiment of a preheating bulk erase device of the present invention.

FIG. 5 shows an example of the device for performing bulk erase of an optical medium as constructed in FIG. 4 while heating it. Conventional bulk erase comprises a motor 11 for rotating a medium 10 as shown in FIG. 5, an actuator 12 for focusing a laser on a film surface of the medium 10, and a slider 13 for moving the actuator 12 in the radial direction of the medium 10.

According to the present invention, the following elements are arranged additionally to constitute the preheating bulk erase device. Specifically, a reflecting mirror 14 is disposed on the same side of the medium 10 as the side subjected to laser irradiation at a predetermined angle. Light of a strong visible-light lamp 15 is projected as parallel light to the reflecting mirror 14 via a lens 16 so as to apply light reflected by the reflecting mirror 14 to a wider area than a spot of the laser beam on the medium 10.

17 is a non-contact temperature sensor arranged adjacent to the medium 10 and for measuring the temperature of a substrate heated by lamp irradiation.

18 is a control unit for controlling ON/OFF and the intensity of the strong visible-lamp 15 in accordance with information on the rotating conditions of the motor 11 and the substrate temperature and controlling the motor 11.

As for a method of heating the medium, a method which raises an ambient temperature of the medium, infrared heating by an infrared heater or the like may be adopted other than the method which uses a visible-light lamp as in the present embodiment.

The strong visible-light lamp 15 applies light out of a lamp having a peak of light emission between ultraviolet wavelength and far infrared wavelength to an area wider than a spot of the laser beam. At this occasion, the control unit 18 controls the intensity of the strong visible-light lamp 15 in accordance with information on the substrate temperature detected by the non-contact temperature sensor 17 so as to raise the temperature of the medium 10 up to a temperature lower than a softening point of the substrate.

Figure 3:
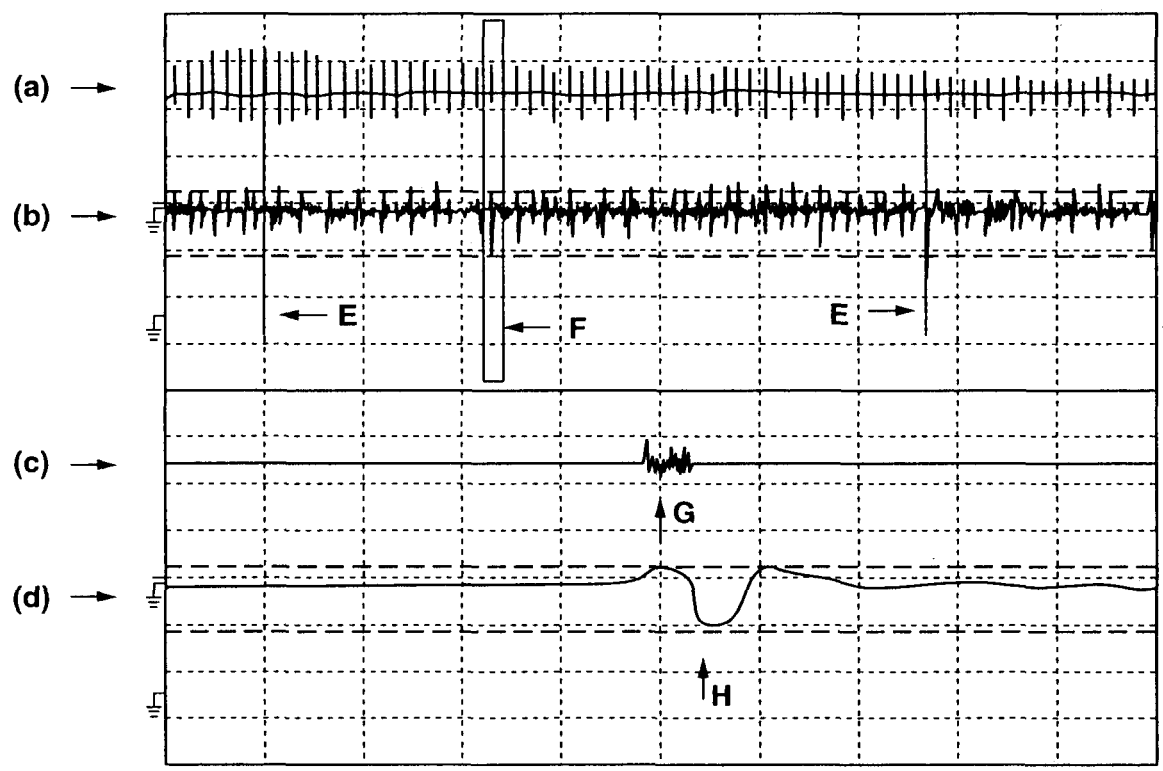
FIG. 3 is a signal waveform diagram illustrating a relationship between an address signal and a tracking-error signal at a tenth track position from the zone boundary of a totally bulk-erased medium.

At this time, the temperature of the medium 10 is, preferably, in a range of 80° C. or higher to a softening point or lower for heating, for example, as a temperature which meets the condition of allowing a sufficient lowering of an increase in tracking error in the vicinity of the zone boundary as described in FIG. 3.

If an in-surface temperature difference of the medium 10 is large, warping occurs at the medium. Thus, control is carried out within 30° C., for example, as an in-surface temperature difference in a range that deviation or impossible achievement of a focus due to occurrence of warping is not produced.

Immediately after completion of application of the laser beam and heating by the strong visible-light lamp 15, the medium 10 is in high temperature condition and softened. Thus, if rotation of the medium 10 is stopped immediately, the medium can be deformed or jump out of a chucking portion.

On this account, according to the present invention, the control unit 18 controls the motor 11 to continue rotation of the medium 10 until the temperature of the medium reaches a temperature within a range from an ordinary temperature to 50° C. after completion of application of the laser beam and heating.

Moreover, the control unit 18 feedback-controls the strong visible-light lamp 15 in accordance with detected temperature information captured from the non-contact temperature sensor 17 so as to maintain the temperature of the medium 10 constant.

A characteristic of the bulk-erased medium was examined by using the device in FIG. 5. Bulk erase was performed under the conditions that the linear velocity in a laser applying portion is 7.5 m/s. At first, four samples as shown in Table in FIG. 6 were prepared to examine a change in the recording sensitivity. In Table in FIG. 6, a sample number 1 is a sample which is not subjected to bulk erase, a sample number 2 is a sample which is subjected to normal bulk erase, a sample number 3 is a sample which is subjected to normal bulk erase and heating, and a sample number 4 is a sample which is subjected to bulk erase with laser power reduced from 800 mW to 600 mW for the sample number 2 and with lamp heating.

Figures 6, 7:
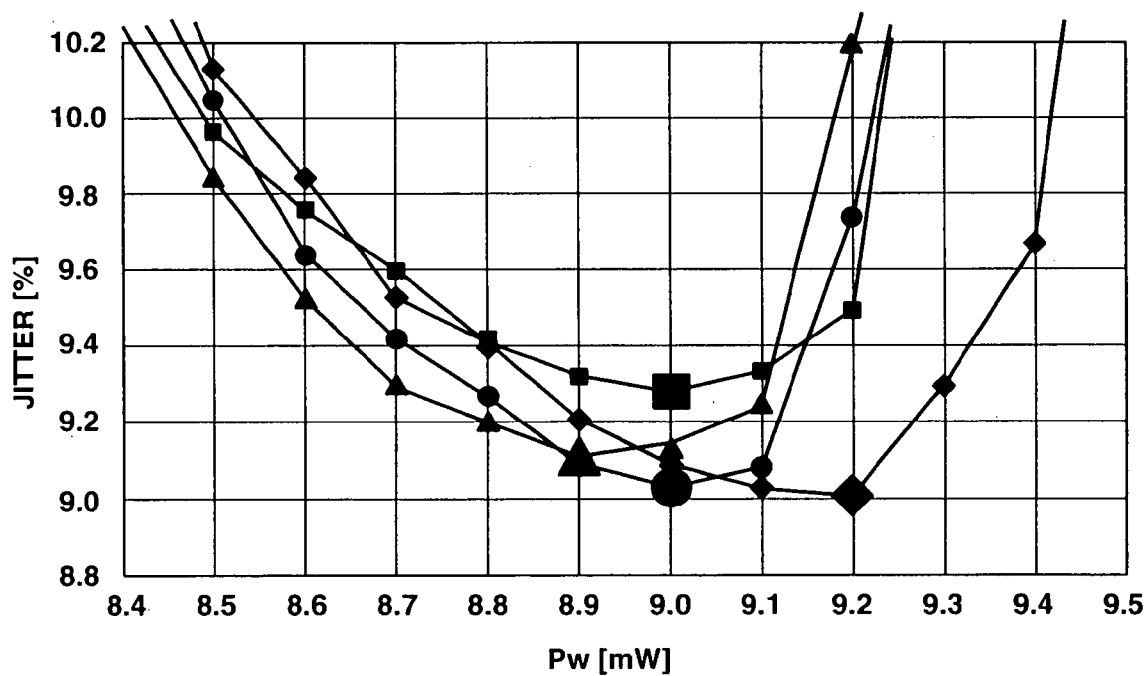
FIG. 6 is a table illustrating the contents of various substrate samples used in the present invention.
FIG. 7 is a characteristic view illustrating a relationship between a Jitter value of a reproducing signal and a recording power for each optical recording medium.

FIG. 7 shows the result of measurement of a value of optimum recording power for the samples. In FIG. 7, the horizontal axis shows a recording power, and the vertical axis shows a Jitter value of a reproducing signal, which reveals that as the recording power upon minimum Jitter value is smaller, the sensitivity is excellent.

In FIG. 7, a diamond-shaped mark shows data of the sample number 1 in FIG. 6, a square mark shows data of the sample number 2 in FIG. 6, a triangular mark shows data of the sample number 3 in FIG. 6, and a circular mark shows data of the sample number 4 in FIG. 6.

In FIG. 7, it is revealed that the optimum recording power of the sample number 1 which is not subjected to bulk erase is 9.2 mW, whereas a sample which is subjected to bulk erase has high sensitivity. Specifically, the optimum recording power of the sample number 3 is 8.9 mW, and the optimum recording powers of the sample numbers 2 and 4 are both 9.0 mW.

This shows that the amounts of sensitivity shift are the same for the sample numbers 2 and 4. That is, it shows that laser power of bulk erase to achieve the same amount of sensitivity shift can be reduced from 800 mW to 600 mW by lamp irradiation according to the present invention.

Figure 8:
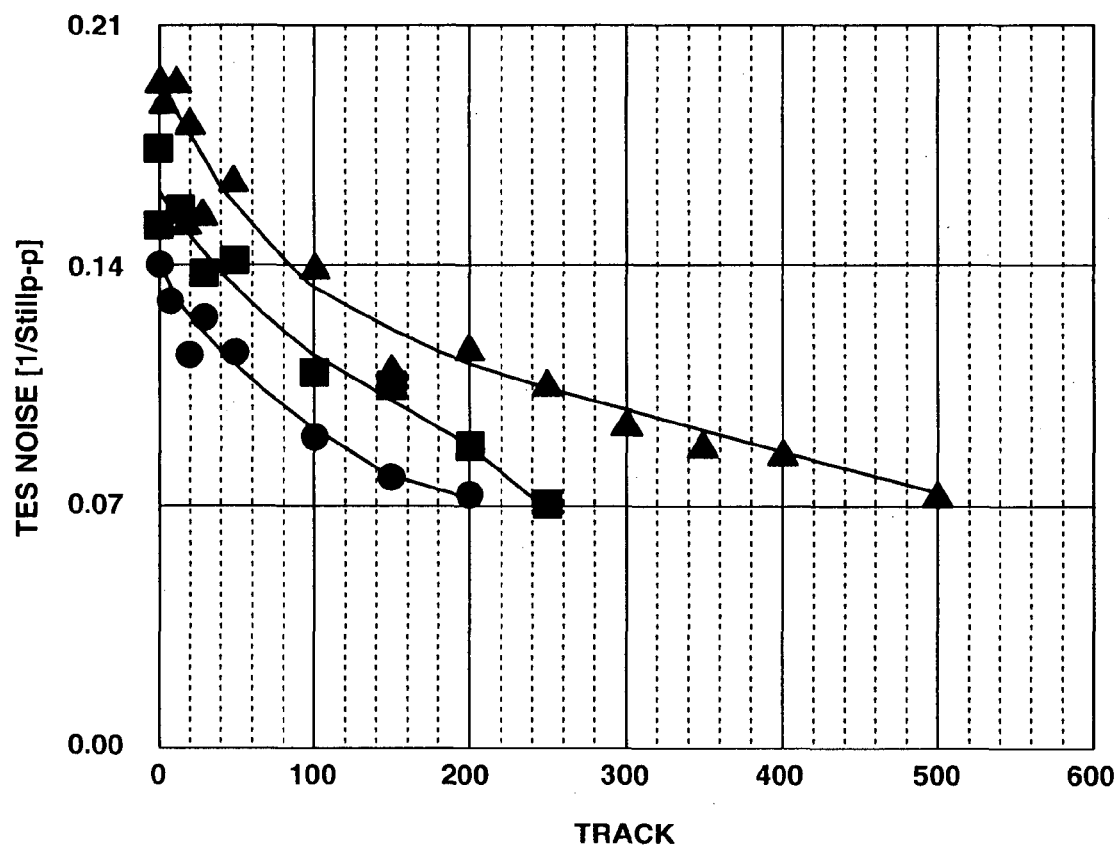
FIG. 8 is a characteristic view illustrating a relationship between a tracking-error increasing amount and the track number from the zone boundary for each optical medium.

The tracking-error increasing amounts for the sample numbers 2, 3, and 4 among the samples are shown in FIG. 8. In FIG. 8, the vertical axis shows a tracking-error increasing amount, and the horizontal axis shows a track number counted from the zone boundary, wherein TES NOISE is a noise derived from an address of a tracking-error signal.

It is seen from FIG. 8 that a tracking error become smaller in order of the sample number 3 (triangular mark)→the sample number 2 (square mark)→the sample number 4 (circular mark). Among these, the sample number 2 (square mark) and the sample number 4 (circular mark) have the same amount of sensitivity shift. Thus, either of the bulk erase conditions may be adopted to produce aimed sensitivity shift. Especially, the use of a device having combination of preheating of a medium by lamp irradiation and bulk erase of low laser irradiation as the sample number 4 (circular mark) allows manufacturing of a medium having a small tracking-error increasing amount.

The heating means of the present invention is not limited to those with strong visible-light lamp 15 in FIG. 5, and may be constructed to raise an ambient temperature by using an air-conditioner, for example, or to perform infrared heating by an infrared heater.

When constructing the heating means like these, it is constructed in the same way as mentioned above to raise the temperature of the medium to a temperature lower than a softening point, control an in-surface temperature difference of the medium within 30° C., continue rotation of the medium until a temperature of the medium reaches a temperature within a range from an ordinary temperature to 50° C. after completion of application of the laser beam and heating, and maintain by feedback a temperature of the medium constant.

The preheating bulk erase method of the present invention comprises carrying out magnetization or annealing of a recording film by applying a laser beam to the recording film while rotating a medium and performing a heating process for heating the medium upon irradiation of the laser beam by using, for example, the preheating bulk erase device as shown in FIG. 5.

At this occasion, the heating process comprises raising a temperature of the medium lower than a softening point, controlling an in-surface temperature difference of the medium within 30° C., and maintaining by feedback a temperature of the medium constant. Moreover, it comprises continuing rotation of the medium until a temperature of the medium reaches a temperature within a range from an ordinary temperature to 50° C. after completion of the heating process.

(Embodiment 2)

Figure 9:
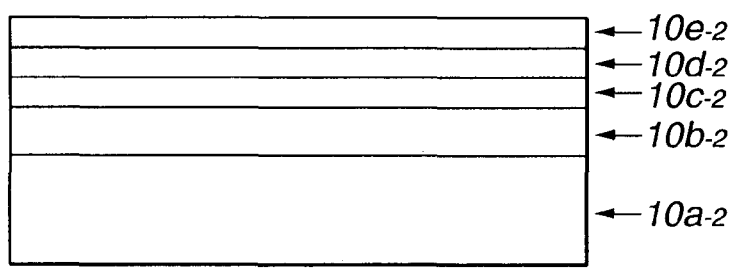
FIG. 9 is an explanatory view showing a sectional structure of an optical recording medium using a single-layer recording film used in the present invention.

Next, we will explain an embodiment using a magneto-optically recordable/reproducible single-layer recording film. With a section of the used medium, as shown in FIG. 9, for example, a protective layer 10b-2, a magneto-optical recording layer 10c-2, a protective layer 10d-2, and a reflective layer 10e-2 are laminated and formed one upon another by a sputtering method on a resin substrate 10a-2 having an address layout in FIG. 1.

First, a chamber for sputtering each layer was sufficiently evacuated in advance until the reached degree of vacuum is lower than $10^{-5}$ Pa.

As the protective layer 10b-2, a silicon nitride film of 100 nm was formed by performing reactive sputtering of a silicon target in the atmosphere of argon and nitrogen.

As the magneto-optical recording layer 10c-2, a film was formed to obtain 50 nm film thickness by performing DC sputtering of a TbFeCo target in the atmosphere of argon. A composition of the target and a condition of film formation were adjusted in advance to achieve a transition-metal rich film having 300° C. Curie temperature, 20 Koe or higher coercivity in the room temperature, and 50 emu/cc saturation magnetization in the room temperature.

As the protective layer 10d-2, a silicon nitride film of 30 nm was formed by performing reactive sputtering of a silicon target in the atmosphere of argon and nitrogen.

As the reflective film 10e-2, a film of 50 nm thickness was formed by performing DC sputtering of an Al target in the atmosphere of argon.

A characteristic of the samples manufactured with the above film structure was examined by carrying out bulk erase by the device in FIG. 5. Bulk erase was carried out under the conditions that the linear velocity in a laser applying portion is 7.5 m/s. At first, four samples shown in Table in FIG. 10 were manufactured to examine a change in recording sensitivity in the same way as in the embodiment 1.

It is seen from the results that, as shown in Table in FIG. 10, sample numbers, 2-2, 2-3, 2-4 have increased sensitivity as compared with a sample number 2-1 by undergoing laser irradiation and/or lamp heating. Moreover, it is seen that the sample numbers 2-2, 24 have the same optimum sensitivity. That is, the same energy is provided to the recording films of the sample numbers 2-2, 2-4 by laser irradiation and lamp heating.

Then, a tracking-error increasing amount of the samples was examined at the tracks on the address side. When showing the rate of a tracking error at a hundredth track from the address to a track jump amplitude, the tracking-error ratio in Table in FIG. 10 was obtained. This reveals that the sample number 24 has the smallest tracking error.

(Embodiment 3)

Next, we will explain an embodiment using a phase-change type recording film. With a section of the used medium, as shown in FIG. 11, for example, a protective layer 10b-3, a phase-change type recording layer 10c-3, a protective layer 10d-3, and a reflective layer 10e-3 are laminated and formed one upon another by a sputtering method on a resin substrate 10a-3 having an address layout in FIG. 1.

First, a chamber for sputtering each layer is sufficiently evacuated in advance until the reached degree of vacuum is lower than $10^{-5}$ Pa.

As the protective layer 10b-3, a ZnS—SiO$_2$ film of 130 nm was formed by performing sputtering of a ZnS—SiO$_2$ target in the atmosphere of argon.

As the phase-change type recording layer 10c-3, a film was formed to obtain 15 nm film thickness by performing DC sputtering of a GeSbTe target in the atmosphere of argon. A composition of the target and a condition of film formation were adjusted in advance to have 500° C. crystallizing temperature and 700° C. melting point.

As the protective layer 10d-3, a ZnS—SiO$_2$ film of 20 nm was formed by performing sputtering of a ZnS—SiO$_2$ target in the atmosphere of argon.

As the reflective film 10e-3, a film of 150 nm thickness was formed by performing DC sputtering of an Al target in the atmosphere of argon.

A characteristic of the samples manufactured with the above film structure was examined by carrying out bulk erase by the device in FIG. 5. Bulk erase was carried out under the conditions that the linear velocity in a laser applying portion is 4 m/s. At first, four samples shown in Table in FIG. 12 were manufactured to examine a change in recording sensitivity in the same way as in the embodiment 1.

It is seen from the results that, as shown in Table in FIG. 12, sample numbers 3-2, 3-3, 3-4 have increased sensitivity as compared with a sample number 3-1 by laser irradiation and/or lamp heating. Moreover, it is seen that the sample numbers 3-2, 3-4 have the same optimum sensitivity. That is, the same energy is provided to the recording films of the sample numbers 3-2, 3-4 by laser irradiation and lamp heating.

Then, a tracking-error increasing amount of the samples was examined at the tracks on the address side. When showing the rate of a tracking error at the hundredth track from the address to a track jump amplitude, the tracking-error ratio in Table in FIG. 12 was obtained. This reveals that the sample number 3-4 has the smallest tracking error.

As is described above, according to the preheating bulk erase device for an optical recording medium of the present invention, magnetization, annealing, and initialization can be carried out to an optical recording medium with an increase in tracking error at a band boundary being restrained. This allows fulfillment of magnetization, annealing, and initialization of the entire surface of a medium at high speed, resulting in possible shortening of process time and manufacturing of a high-quality medium having less number of replacement sectors.

In Claims 5 to 8, for example, by putting a temperature of the medium within a range of 80° C. or higher and a temperature of softening point or lower, an increase in tracking error in the neighborhood of the zone boundary can be reduced sufficiently.

As in Claims 9 to 12, by controlling an in-surface temperature difference of the medium within 30° C., warping of the medium is prevented from occurring, avoiding a situation of deviation or impossible achievement of a focus.

According to Claims 13 to 16, rotation of the medium can be continued until a temperature of the medium reaches a temperature within a range from an ordinary temperature to 50° C. after completion of application of the laser beam and heating, preventing the medium from being deformed or jumping out of a chucking portion after completion of bulk erase.

According to Claims 17 to 20, a temperature of the medium is maintained constant, leading to enhanced reliability of the device.

According to the preheating bulk erase method for an optical recording medium of the present invention, magnetization, annealing, and initialization to an optical recording medium can be carried out with a simple method and with an increase in tracking error at the band boundary being restrained. This allows fulfillment of magnetization, annealing, and initialization of the entire surface of the medium at high speed, resulting in possible shortening of process time and manufacturing of a high-quality medium having less number of replacement sectors.

In Claims 25 to 28, for example, by putting a temperature of the medium within a range of 80° C. or higher to a temperature of softening point or lower, an increase in tracking error in the neighborhood of the zone boundary can be reduced sufficiently.

As in Claims 29 to 32, by controlling an in-surface temperature difference of the medium within 30° C., warping of the medium is prevented from occurring, avoiding a situation of deviation or impossible achievement of a focus.

According to Claims 33 to 36, rotation of the medium can be continued until a temperature of the medium reaches a temperature within a range from an ordinary temperature to 50° C. after completion of application of the laser beam and heating, preventing the medium from being deformed or jumping out of a chucking portion after completion of bulk erase.

According to Claims 37 to 40, a temperature of the medium is maintained constant, leading to enhanced reliability of the device.

According to the optical recording medium as described in Claims 41 and 42 of the present invention, fulfillment of bulk erase restrains a change in recording sensitivity due to its use, and have no increase in tracking error in the neighborhood of the zone boundary, obtaining remarkably enhanced performance and quality.

INDUSTRIAL APPLICABILITY

The present invention can be applied to an optical recording medium having outline shaped like a non-circle.

The present invention can be also applied, as shown in FIG. 13, for example, to a card-type optical recording medium constructed by including a data record recording/reproducing area 20a in a card main body 20 of post-card size or business-card size, for example.

The invention claimed is:

1. A preheating bulk erase device for an optical recording medium comprising a heating unit and a laser unit,
wherein,
the laser unit applies a beam to a recording film of the optical recording medium while the optical recording medium is rotated,
the heating unit comprises a lamp, a lens, a reflecting mirror, a temperature sensor, and a controller,
the lamp projects light to the reflective mirror via the lens so that the projected light is reflected onto a predetermined area of said medium, and
the controller controls the intensity of the lamp light in accordance with a temperature of the medium sensed by the sensor and a rotation of the medium.

2. The preheating bulk erase device for an optical recording medium as specified in claim 1, wherein said heating unit applies visible-light out of the lamp having a peak of light emission between ultraviolet wavelength and far infrared wavelength to a wider area than a spot of said laser beam.

3. The preheating bulk erase device for an optical recording medium as specified in claim 1, wherein said heating unit raises the temperature of said medium to a temperature lower than a softening point of a substrate.

4. The preheating bulk erase device for an optical recording medium as specified in claim 2, wherein said heating unit raises the temperature of said medium to a temperature lower than a softening point of a substrate.

5. The preheating bulk erase device for an optical recording medium as specified in claim 1, wherein said heating unit controls an in-surface temperature difference of said medium within 30° C.

6. The preheating bulk erase device for an optical recording medium as specified in claim 2, wherein said heating unit controls an in-surface temperature difference of said medium within 30° C.

7. The preheating bulk erase device for an optical recording medium as specified in claim 1, further comprising a unit for continuing rotation of said medium until a temperature of said medium reaches a temperature within a range from an ambient temperature to 50° C. after completion of application of said laser beam and heating.

8. The preheating bulk erase device for an optical recording medium as specified in claim 2, further comprising a unit for continuing rotation of said medium until a temperature of said medium reaches a temperature within a range from an ambient temperature to 50° C. after completion of application of said laser beam and heating.

9. The preheating bulk erase device for an optical recording medium as specified in claim 1, further comprising a feedback unit for detecting a temperature of said medium and feeding back the detected temperature to said heating unit so as to maintain the temperature of the medium constant.

10. The preheating bulk erase device for an optical recording medium as specified in claim 2, further comprising a feedback unit for detecting a temperature of said medium and feeding back the detected temperature to said heating unit so as to maintain the temperature of the medium constant.

11. A preheating bulk erase device for an optical recording medium with a recording film, the device comprising a laser unit, a heating unit, and a rotation unit,
wherein,
the laser unit applies a laser beam to the recording medium while said recording medium is rotated by the rotation unit,
the heating unit performs a heating process for heating said recording medium upon application of the laser beam, the heating unit comprises a lamp, a lens, a reflecting mirror, a temperature sensor, and a controller,
the lamp projects light to the reflective mirror via the lens so that the projected light is reflected onto a predetermined area of said medium, and
the controller controls the intensity of the lamp light in accordance with a temperature of the medium sensed by the sensor and the rotation of said medium.

12. The preheating bulk erase device for an optical recording medium as specified in claim 11, wherein said heating process is carried out by applying light out of lamp having a peak of light emission between ultraviolet wavelength and far infrared wavelength to a wider area than a spot of said laser beam.

13. The preheating bulk erase device for an optical recording medium as specified in claim 11, wherein said heating process includes a process for raising the temperature of said medium to a temperature lower than a softening point of a substrate.

14. The preheating bulk erase device for an optical recording medium as specified in claim 12, wherein said heating process includes a process for raising the temperature of said medium to a temperature lower than a softening point of a substrate.

15. The preheating bulk erase device for an optical recording medium as specified in claim 11, wherein said heating process includes a process for controlling an in-surface temperature difference of said medium within 30° C.

16. The preheating bulk erase device for an optical recording medium as specified in claim 12, wherein said heating process includes a process for controlling an in-surface temperature difference of said medium within 30° C.

17. The preheating bulk erase device for an optical recording medium as specified in claim 11, wherein the device is configured to continue rotation of said medium until a temperature of said medium reaches a temperature within a range from an ambient temperature to 50° C. after completion of application of said laser beam and heating.

18. The preheating bulk erase device for an optical recording medium as specified in claim 12, wherein the device is configured to continue rotation of said medium until a temperature of said medium reaches a temperature within a range from an ambient temperature to 50° C. after completion of application of said laser beam and heating.

19. The preheating bulk erase device for an optical recording medium as specified in claim 11, wherein said heating process includes a process for detecting a temperature of said medium and feeding back the detected temperature to said heating unit so as to maintain the temperature of the medium constant.

20. The preheating bulk erase device for an optical recording medium as specified in claim 12, wherein said heating process includes a process for detecting a temperature of said medium and feeding back the detected temperature to said heating unit so as to maintain the temperature of the medium constant.

21. An optical recording medium by utilizing a preheating bulk erase device, the optical recording medium comprising a recording film the device comprising a laser unit, a heating unit, and a rotation unit:

wherein, the laser unit applies a laser beam to said recording medium while said recording medium is rotated by said rotation unit, the heating unit performs a heating process for heating said recording medium upon application of the laser beam, the heating unit comprises a lamp, a lens, a reflecting mirror, a temperature sensor, and a controller, the lamp projects light to the reflective mirror via the lens so that the projected light is reflected onto a predetermined area of said medium, and the controller controls the intensity of the lamp light in accordance with a temperature of the medium sensed by the sensor and the rotation of said medium.

* * * * *